(12) United States Patent
Antonakakis et al.

(10) Patent No.: US 11,655,610 B2
(45) Date of Patent: May 23, 2023

(54) SEISMIC DEFENCE STRUCTURES

(71) Applicants: IMPERIAL COLLEGE INNOVATIONS LIMITED, London (GB); UNIVERSITE D'AIX MARSEILLE, Marseilles (FR); ECOLE CENTRALE DE MARSEILLE, Marseilles (FR); CENTRE NATIONAL DE LA RECHERCHE SCIENTIFIQUE, Paris (FR)

(72) Inventors: Tryfon Antonakakis, London (GB); Richard Craster, London (GB); Younes Achaoui, Paris (FR); Stefan Enoch, Paris (FR); Sebastien Guenneau, Paris (FR); Stephane Brule, Saint Genis Laval (FR)

(73) Assignees: Imperial College Innovations Limited, London (GB); Universite D'Aix Marseille, Marseilles (FR); Centre National de la Recherche Scientifique, Paris (FR); Ecole Centrale de Marseille, Marseilles (FR)

( * ) Notice: Subject to any disclaimer, the term of this patent is extended or adjusted under 35 U.S.C. 154(b) by 0 days.

(21) Appl. No.: 16/343,605

(22) PCT Filed: Oct. 20, 2017

(86) PCT No.: PCT/EP2017/076844
§ 371 (c)(1),
(2) Date: Apr. 19, 2019

(87) PCT Pub. No.: WO2018/073412
PCT Pub. Date: Apr. 26, 2018

(65) Prior Publication Data
US 2020/0048858 A1    Feb. 13, 2020

(30) Foreign Application Priority Data

Oct. 21, 2016  (GB) .................................. 1617808

(51) Int. Cl.
*E02D 31/08*     (2006.01)
*E04H 9/02*      (2006.01)

(52) U.S. Cl.
CPC ............... *E02D 31/08* (2013.01); *E04H 9/02* (2013.01)

(58) Field of Classification Search
CPC .............. E01C 3/06; E02D 31/08; E04H 9/02
See application file for complete search history.

(56) References Cited

U.S. PATENT DOCUMENTS 1,725,136 A * 8/1929 Hahl ..................... C07C 233/12
                                                           564/354
4,484,423 A * 11/1984 McClure, Jr. ........... E02D 31/08
                                                            52/167.1

(Continued)

FOREIGN PATENT DOCUMENTS

JP      03103534 A    4/1991
JP      04155018 A    5/1992

(Continued)

OTHER PUBLICATIONS

S. Brule et al,. "Experiments on Seismic Metamaterials: Molding Surface Waves" Physical Review Letters 112, 133901, 2014.

(Continued)

*Primary Examiner* — Carib A Oquendo
(74) *Attorney, Agent, or Firm* — Lowe Graham Jones PLLC

(57) ABSTRACT

A seismic wave shield for protecting an area from seismic vibrations and a method of shielding an area from seismic waves by installing a seismic wave shield. The seismic wave shield comprises a set of columns embedded in regolith and (Continued)

in contact with bedrock. There is a material contrast between a material forming the columns and the regolith.

19 Claims, 4 Drawing Sheets

(56) References Cited

U.S. PATENT DOCUMENTS

| | | | | |
|---|---|---|---|---|
| 4,683,691 | A * | 8/1987 | Malzahn | E04H 9/12 |
| | | | | 109/1 S |
| 5,173,012 | A * | 12/1992 | Ortwein | E01B 1/002 |
| | | | | 238/283 |
| 5,174,082 | A * | 12/1992 | Martin | E02D 31/08 |
| | | | | 405/302.5 |
| 2004/0091316 | A1 * | 5/2004 | Takemiya | E01C 3/06 |
| | | | | 404/71 |
| 2006/0115334 | A1 * | 6/2006 | Raunisto | E02D 31/08 |
| | | | | 405/267 |
| 2015/0337518 | A1 * | 11/2015 | Bezac | E02D 27/34 |
| | | | | 52/741.15 |
| 2017/0002535 | A1 * | 1/2017 | Surjaatmadja | E02D 3/12 |

FOREIGN PATENT DOCUMENTS

| | | |
|---|---|---|
| JP | 2008223302 A | 9/2008 |
| JP | 2014051852 A | 3/2014 |
| JP | 2014214509 A | 11/2014 |
| SU | 1101536 A1 | 7/1984 |

OTHER PUBLICATIONS

T. Antonakakis et al,. "High frequency asymptotics for Microstructured thin elastic platers and platonics" Proceedings of the Royal Society of London A 468, 1408, 2012.

T. Antonakakis et al,. "Homogenization for elastic photonics crystals and dynamic anisotropy" Journal of the Mechanics and Physics of Solids 71, 84-96, 2014.

Tristan Vey. "Une experience prometteuse d'invisibilite sismique" published Apr. 8, 2014.

S-H Kim and M. P. Das. "Seismic Waveguide of Metamaterials" Modern Physics Letters B, 26 (17), 1250105 (2012).

B. Ungureanu et al,. "Possible Measures of Taking Over/Dynamic Control of Seismic Actions Applicable to Urban Utility Systems, Seismic Waves Deflection/Damping Using Metamaterials" Buletinul AGIR; Supliment 2, 2015.

Y Achaoui et al,. "Pinned seismic metamaterials Ultra-low frequency stop bands in sedimentary soils structured with columns of concrete clamped to the bedrock".

M. Miniaci et al,. "Large scale mechanical metamaterials as seismic shields" New Journal of Physics, 18 (2016) 083041.

Y Achaoui et al,. "Clamped seismic metamaterials: ultra-low frequency stop bands" New Journal of Physics, 19, (2017) 063022.

Y. Achaoui et al,. "Seismic waves damping with arrays of inertial resonators" Extreme Mechanics Letters 8 (2016) 30-37.

* cited by examiner

SEISMIC DEFENCE STRUCTURES

FIELD OF INVENTION

The present invention relates to seismic defence structure, in particular structures offering seismic defence for buildings or groups of buildings.

BACKGROUND

According to the US Geological Survey there are more than three million earthquakes every year worldwide, the vast majority are magnitude 3.9 or lower but more than 900 measure 5.0 or higher on the Richter scale. The ground vibrations caused by even minor earthquakes have an impact upon the structural integrity of buildings. Similarly intrusive ground vibrations from urban train systems, subways, machinery such as piledrivers and roads often affect property values or land usage. Seismic waves are made up of surface waves (Rayleigh waves), pressure waves and shear waves which travel through the ground. Surface waves cause the majority of any damage and travel farthest, but volume (pressure and shear) waves also cause damage, especially in cases of wave trapping in sedimentary basins.

It is desirable to provide a defence structure to prevent seismic waves from reaching buildings. Waves of a frequency of around 1 to 10 Hz in particular can cause a large amount of damage because such low frequencies travel large distances and they often match the resonant fundamental frequency of buildings. Even small magnitudes of seismic waves due to machinery or nearby railways can cause significant damage to buildings, especially over time. In buildings such as nuclear power plants and oil refineries, even a small level of damage to the building can have disastrous consequences.

In "Seismic metamaterial: how to shake friends and influence waves?" (S. Brûlé, et al.), a seismic test was performed on a regular square grid of empty cylindrical boreholes of around 5 m depth, 320 mm diameter and 1.73 m spacing. The test showed reduced transmission through the ground of seismic waves of around 50 Hz due to destructive interference of seismic waves in the transmission direction caused by the periodicity of the grid (this is a so-called partial stop band i.e. a range of frequencies for which elastic waves of certain polarization cannot propagate in certain crystallographic directions within the array).

In "Artificial Seismic Shadow Zone by Acoustic Metamaterials" (Sang-Hoon Kim and Mukunda P. Das) and "Seismic Waveguide of Metamaterials" (Sang-Hoon Kim and Mukunda P. Das), a defence was proposed that consisted of huge empty boxes (meta-boxes) with side-holes corresponding to the resonance frequencies of seismic waves. The meta-barrier composed of many meta-boxes attenuates the seismic waves, which reduces the amplitude of the wave exponentially by dissipating the seismic energy. These meta-barriers are placed in the ground around a building to be protected.

"Possible Measures Of Taking-Over/Dynamic Control Of Seismic Actions Applicable To Urban Utility Systems. Seismic Waves Deflection/Damping Using Metamaterials" (Ungureanu et al.) describes the reflection of seismic waves and the methods described above (empty boreholes in a periodic pattern and meta-boxes to attenuate waves) as seismic defences for buildings.

SUMMARY OF INVENTION

In one aspect the invention provides a seismic wave shield comprising a set of columns embedded in regolith and in contact with bedrock, wherein the columns are formed of a material with a material contrast with the regolith. Such a shield reflects seismic waves by producing a stop band which covers a larger range of frequencies, and has a decreased lower frequency limit over that of the stop band in the empty borehole array of the prior art. The shield has a wide zero frequency band-gap. Seismic waves having a frequency within the stop band cannot pass through the shield. The larger bandwidth of the stop band of the present invention over the prior art is due to the contact between columns and bedrock and a material parameter (for example, the density and/or Young's Modulus and/or Bulk modulus and/or shear modulus) mismatch between the regolith (often soft soil) and the material in the column. Furthermore, the lower limit of the stop band approaches 0 Hz, to create a zero frequency band gap, due to the contact between the columns and the bedrock. This contact effectively pins or clamps the columns to the bedrock.

The increased bandwidth, near-zero frequency band-gap and increased upper frequency of the stop band allow the present invention to reflect a large band of seismic waves of a low frequency. Thus the stop bands cover the frequencies that travel farthest and cause the most damage to buildings. The stop band also covers most resonant frequencies of buildings. The effect is caused by wave physics, so the composition, arrangement and shape of the columns can be chosen according to wave physics to produce the desired stop band.

In order to create a stop band covering frequencies around 1 to 10 Hz using the method of empty boreholes, the holes would need diameters of a few metres to tens of metres. It is clearly not practical to have large holes in the ground, particularly in areas where other buildings are nearby. Thus the present invention achieves a useful stop band in a practical manner which is not achievable with methods of the prior art.

The material contrast between the columns and the regolith occurs when a property of the material of the column is different from that property of the regolith. For example, the columns may have a different density, Young's modulus, shear modulus or Bulk modulus from the regolith. More than one property may differ between the materials of the columns and the regolith. For example a material forming columns may have a different density and a different Young's Modulus from the regolith material. The material of the columns may be a solid, liquid, foam or gel.

The material contrast may be achieved by the columns having a higher density than the regolith or the material contrast may be achieved by the columns having a higher Young's modulus than the regolith or the material contrast may be achieved by the columns having a higher Bulk modulus than the regolith or the material contrast may be achieved by the columns having a higher shear modulus than the regolith. The material contrast may be achieved by a combination of two or more of these conditions.

The material contrast may be achieved by the columns having a density of at least 1.1 times the density of the regolith or the material contrast may be achieved by the columns having a Young's modulus of at least 10 times the Young's modulus of the regolith or the material contrast may be achieved by the columns having a Bulk modulus of at least 10 times the Bulk modulus of the regolith or the material contrast may be achieved by the columns having a shear modulus of at least 10 times the shear modulus of the regolith. The material contrast may be achieved by a combination of two or more of these conditions. The Young's modulus of soil may be 153 MPa and the Young's modulus of the bedrock may be 30 GPa.

The columns may have a larger density than the regolith. The columns may be at least 1.1 times as dense as the regolith.

The density range of the regolith may be 1600 to 2300 kg/m$^3$ and may be 1800 kg/m$^3$ (or where the regolith is peat the density may be 1200 to 1300 kg/m$^3$). The density of the bedrock may be 2500 kg/m3. The density of columns, which may be formed of concrete, may be 2300 to 2500 kg/m$^3$. Other embodiments may use special concrete (heavy concretes) which may be denser. The columns may be at least 1.1 times as dense as the regolith. Preferably, the columns may be at least 1.4 times as dense as the regolith. The columns may be at least 4 times as dense as the regolith, for example when the columns are formed of steel pile (density of around 7000 kg/m$^3$).

The columns may have a higher Young's modulus than the regolith. The Young's modulus of the columns may be at least 10 times higher than the Young's modulus of the regolith.

A bottom portion of each of the columns may be embedded in the bedrock. This provides more effective pinning of the columns to the bedrock and reduces the lower frequency limit of the stop band creating a perfect or near-perfect zero frequency band-gap. This is advantageous because reducing the lower limit of the stop band to create such a zero frequency band gap means that lower frequency seismic waves can be blocked.

The height of the bottom portion may be greater than 30 cm. This means that the column is attached more tightly to the bedrock and so the lower limit of the stop band is reduced so that it is closer to zero.

The diameter of columns (Ø) may be guided by an objective of minimal strength capacity designed under vertical loads, and usual practice in drilling has the diameter as 25 to 50 cm, but it could be realized in the range of 10 to 150 cm. The diameter of the columns is chosen dependent on their surroundings so that the columns will not fail under the vertical load applied to the columns by anything situated on top of them. The strength of the material forming the columns and the vertical load that will be applied to them will both affect the diameter chosen. For example, the maximum strength of concrete under vertical loading is usually 12 MPa (for rigid columns) to 25 MPa (for pile). These are the values of the stress corresponding to the failure of the concrete and the diameter of columns formed of concrete will be adapted dependent on the applied vertical load (kN). A higher load will require a larger diameter of column.

The length of the bottom portion of each column that is embedded in the geotechnical bedrock may be at least 3 to 5 times the diameter of the column (3 to 5Ø).

The total volume of the columns may be at least 15% of the volume of the shield. Preferably, the total volume of the columns may be at least 19%. More preferably, the total volume of the columns may be 50% of the volume of the shield. The desired volumes may be calculated using the dilute composite limit for the appearance of partial stop bands (numerical computations support conclusions drawn from Maxwell-Garnett theory).

The depth of the shield is the height of the regolith from the bedrock to ground level. The perimeter of the shield is defined by the outermost columns and the innermost of the shield and the area of the shield is the area inside the perimeter. The volume is the depth multiplied by the area of the shield. This percentage is optimised to block seismic waves.

The columns may be positioned periodically, for example on points of a Bravais lattice, or quasi-periodically, in the shield. This increases the frequencies reflected by the shield by causing destructive interference for certain frequencies in the manner of a metamaterial. The columns may be positioned on points of a hexagonal, square, triangular, other Bravais lattice or quasi-periodic lattice, or on points on a quasi-random lattice. The high contrast in parameters between the columns and the surrounding material (i.e. the material contrast) mean that the columns behave as Helmholtz resonators and the resulting localised resonances produce the stop band. Thus the periodicity of the columns can be broken and the columns may be placed in a near-periodic arrangement or a random arrangement and the shield will still produce the stop band.

A width of the shield in the direction of waves to be blocked may be at least 2 rows of columns. More preferably a width of the shield in the direction of waves to be blocked may be at least 3 rows of columns. The wider the shield is, the more effectively waves are blocked. The width may be measured in the direction from the area to be protected, radially outwards from the column closest to the area to be protected to the column furthest from the area. Alternatively the width may be measured in the direction between the area to be protected and a source of seismic waves, if the location of that source is known, from the column closest to the source to the column closest to the area to be protected.

The shield may also have a plate attached at a first end of the plate to a first column of the shield, the plate further being attached at a second end of the plate to a second column of the shield. The plate may be attached to sides of the first and second columns. The plates may be attached to the columns at a depth of 5 m below the ground surface. All of the columns in the shield or a sub-set of the columns may be joined by plates. These plates may be made of concrete, steel, a combination of concrete and steel or another solid material. The plates improve the stability of the columns and insert additional stop-bands.

The columns may be formed of concrete or steel or wood or a combination of two or more of these materials, for example steel and concrete. These materials have a high density and Young's Modulus, so the mismatch between the columns and the regolith is high, causing the bandwidth of the stop band to be large. The materials forming the columns may vary gradually over the shield from one end of the shield to the other.

The regolith of the invention may be soft soil (e.g. sedimentary soil with clay), alluvial basin, gravel, alluvium, peat or sand. Any material beneath the ground, but above the bedrock may be considered to be part of the regolith. In general, the invention works more effectively, the lower the density or Young's Modulus of the regolith, because this increases the mismatch with the columns which increases the bandwidth of the stop band.

A second aspect of the present invention provides a method of shielding an area from seismic waves by installing a seismic wave shield on at least a part of a perimeter of the area. As discussed above, seismic wave shields prevent the passage of seismic waves having frequencies within the stop band of the seismic wave shield. Installing such a shield around a perimeter of an area will prevent seismic waves of stop band frequencies from entering the area, thus shielding the area and preventing damage from being caused inside the area by seismic waves.

The seismic wave shield may be positioned outside of a lateral perimeter of a building. This prevents seismic waves from reaching the ground beneath a building and so prevents damage to the building. Alternatively, the seismic shield may be positioned partly or wholly inside of the lateral perimeter of a building. This prevents seismic waves from reaching the building.

In some embodiments, the columns may be positioned beneath a building inside the lateral perimeter of the building, but are not foundations of the building. In some embodiments, the columns are not directly attached to the building. In these embodiments, the columns may be provided between foundations of the building, but the columns of the shield are not attached to the building. In some embodiments, the columns do not directly contact the building, for example regolith may be present between the columns and the building.

Additionally, the prevention of seismic waves reaching the structure will lead to less elastic strain, lower pore pressure changes and hence will limit the risk of soil liquefaction occurring.

A third aspect of the present invention provides a seismically shielded building which comprises a seismic wave shield positioned adjacent to a part of a perimeter of a building. In the direction of the shield, the building is protected from seismic waves having a frequency within the stopband of the shield, reducing the chance of damage to the building.

DETAILED DESCRIPTION

Figure 1:
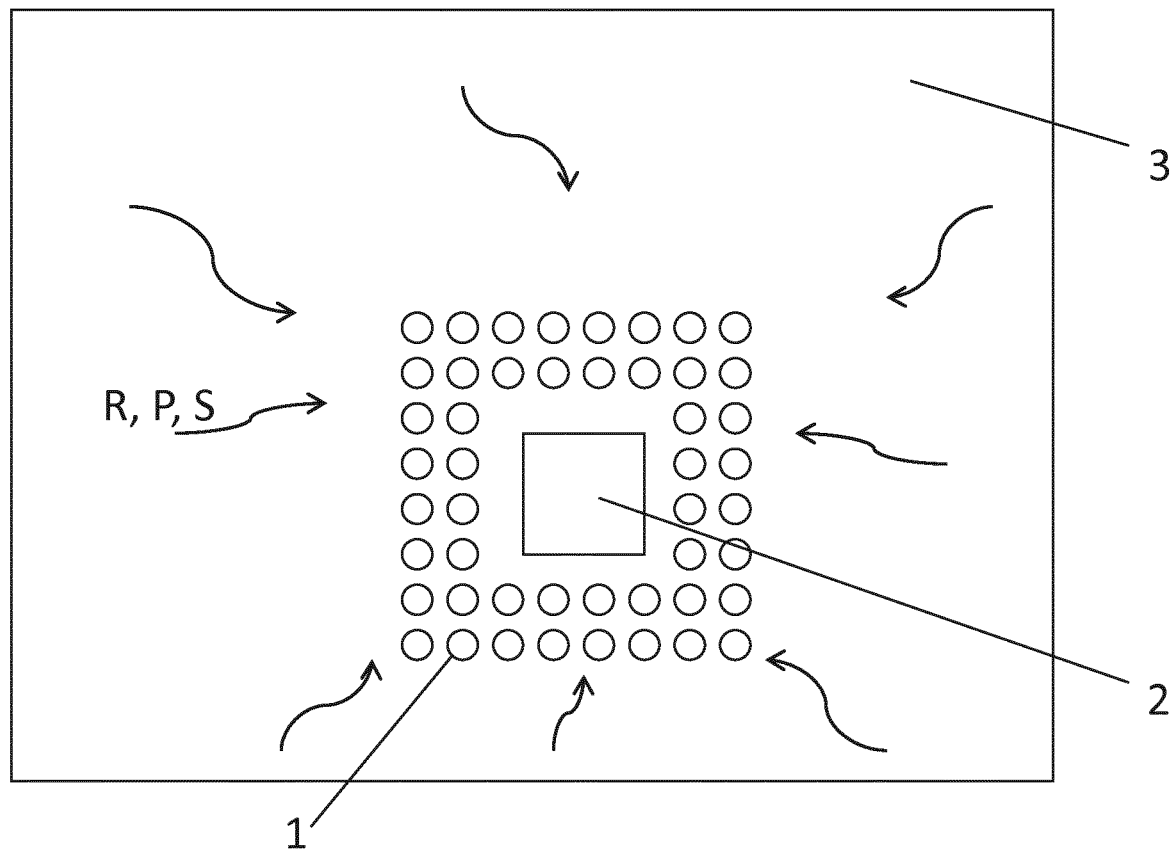
FIG. 1 shows a horizontal section view through the soil of a shield, which is an embodiment of the present invention, surrounding a building.

Seismic waves may travel long distances and cause damage to buildings as discussed above. A seismic wave shield according to the present invention can be installed around an area or building to be protected and the shield will then reflect these waves in order to prevent them from reaching the area or building.

An example of a seismic wave shield according to the present invention comprises a set of columns embedded in superficial soil (for example, alluviums or peat), the columns being clamped to a geotechnical bedrock. The Young's modulus, E, contrasts in this example are the following:

$E_{column} > 100 \cdot E_{superficial\ soil}$ and
$E_{geotechnical\ bedrock} > 5 \cdot E_{superficial\ soil}$.
$1\ MPa < E_{superficial\ soil} < 10\ MPa$
$5\ 000 < E_{column} < 30\ 000\ MPa$.

The Young's modulus of concrete, which may be used as the material for the columns is 15 000 to 30 000 MPa. The Young's modulus of mortar or a mix of soil plus cement grout is around 5 000 MPa. The columns are formed of a material with a strong material contrast with the regolith.

An embodiment of the present invention has a set of cylindrical columns located in the regolith and in contact with the bedrock which is 10 to 200 metres beneath the ground. The columns are in the range of 25 cm to 1.5 m metre in diameter. In this example, they are made of concrete and the bottom 50 cm of the columns are embedded in the bedrock. The columns are positioned in a square array and are spaced 0.5 m to 5 m (with a minimal spacing of 2 to 3 diameters) from their nearest neighbours.

The minimum spacing may be determined by the influence of a column on its nearest neighbours during drilling work whilst assembling the shield. If columns are too close, the drilling effect produced while creating a column could reduce the diameter of adjacent columns, thereby reducing the efficiency of the shield. Drillers' experience had shown that a minimal spacing between 0.5 m and 5 m can limit the occurrence of this effect.

The regolith in this example is soft soil, but in general, regolith is the material lying on the bedrock up to the ground level. It can be made up of many different materials such as soil, loose rock, biological material, sand, alluvium, peat and/or others. The bedrock is solid rock that sits underneath the ground beneath the regolith.

This shield has a stop band for seismic waves of 0 Hz to 20 Hz which means that waves within this range are reflected and partially absorbed by the shield. Energy is partially dissipated as heat. As discussed above, the most damaging seismic waves have a low frequency and are within this range, so this shield is very effective in preventing damage to buildings by seismic waves. These columns can produce a stop band whilst having a much smaller diameter than the boreholes used in the prior art because they are in contact with the bedrock and because the density and modulus of concrete is much greater than that of air. The mismatch between the properties of the columns and the regolith causes the reflection of seismic waves. The contact between the columns and the bedrock increases the bandwidth of the stop band and brings the lower frequency limit of the stop band towards 0 Hz.

Many embodiments of the present invention create a complete stop band for Rayleigh, pressure and shear waves (for all crystallographic directions) and additional partial stop bands.

The lower limit of the stop band for shields according to the present invention is very low and approaches 0 Hz. The stop band is produced near 0 Hz because points in the shield are fixed which mathematically results in a wave dispersion in the shield that does not pass through zero frequency, thereby producing a zero-frequency stop band. The fixed points in the shield are provided by the columns in the shield which are fixed by being in contact with the bedrock.

In this embodiment, the bottom 50 cm of the column is embedded in the bedrock in order to clamp the columns more securely to the bedrock. Attaching the columns more securely to the bedrock, increases the effects of the columns being in contact with the bedrock discussed above. Columns embedded in the bedrock are clamped to the bedrock. By clamping the columns to the bedrock, the lower frequency limit of the stop band is reduced and the bandwidth of the stop band is increased.

Columns in other embodiments may be in contact with the surface of the bedrock or they may be embedded in the bedrock. Preferably, the columns are embedded in the bedrock by more than 0.3 m.

In general, the more of the column that is embedded in the bedrock, the more securely the column will be clamped and the closer to 0 Hz the lower frequency limit of the stop band will be.

The material used for the columns may have a larger or smaller density and/or a higher or lower Young's Modulus and/or a higher or lower bulk modulus and/or a higher or lower shear modulus than the regolith. The mismatch between properties of the columns and the regolith widens the stop band, so the greater the difference between these properties of the regolith and the columns, the larger the bandwidth of the stop band produced by the shield. Thus, when the columns have a larger density than the regolith, the higher the density of the material used to form the columns, the lower the frequency of the stop band produced.

If the contrast in material parameters, (for example, density and/or Young's modulus and/or Bulk modulus and/or shear modulus) is too large, the bandwidth of the stop band reduces, so the contrast should be moderately high, not extremely high, which requires optimization to achieve the optimal low frequency stop band in terms of frequency bandwidth and location in the spectrum with achievable material parameters. The columns may be less than 2 times as dense as the regolith. The Young's modulus of the columns may be less than 200 times the Young's modulus of the regolith. The shear modulus of the columns may be less than 300 times the shear modulus of the regolith.

The columns in this embodiment are made of concrete. Concrete has a much greater density and Young's Modulus than the regolith (soft soil in this embodiment) which is often made up of soil or loose rock. Thus the mismatch between the regolith and concrete is high which causes the range of frequencies covered by the stop band to increase, widening the band and so stopping more seismic waves from propagating through the shield. In other embodiments, the columns may be made of steel which also has a high density and Young's modulus than the regolith. Rubber may also be used for forming columns. Typical values of parameters of concrete are shown in Table 1 and typical values of parameters of several types of sedimentary soil are shown in Table 2.

Alternatively, composite columns of two or more media can be envisaged. Parts of the columns may be formed of stiffer material, for example, steel and parts of the columns may be formed of softer material, for example, concrete or rubber. For example, the columns may be made up of layers of concrete and layers of steel which alternate vertically up the column. Or, the columns may have a concentric circle cross section with alternating circle sections of concrete and steel to improve the reflection properties of the columns and the shield. This is attractive both in terms of manufacture and in improving the band-gap width. Another alternative is for the columns to be formed of a sleeve of steel surrounding a column of concrete.

Columns may alternatively be formed of a combination of concrete and rubber. Concentric layers of concrete and rubber may be used to form the columns. One can also envisage radial layers (alternation of layers in azimuthal rather than radial direction).

The preferred diameter and spacing of the columns is determined by numerical solutions based on the Floquet-Bloch theory for the Navier equations and involves the calculation of band diagrams. The stop band can appear when the spacing between the columns is 10 to 100 times smaller than the wavelength. Note that more columns are better as there is then an exponential increase in the attenuation of seismic waves with an increase in the number of columns.

In some embodiments, the filling fraction (total volume of all columns as a fraction of the volume of the shield) in different parts of the shield may be different. For example the part of the shield most exposed to the waves (for example, the part facing a source of seismic waves) may have a higher filing fraction and a part of the shield further from the source may have a lower filling fraction. This reduces the amount of material needed to produce the columns, reducing cost and effort required to build the shield whilst maintaining a high level of protection in the most important areas.

The filling fraction is calculated by summing the volume of all the columns of the shield and dividing this by the total volume (including columns and regolith inside the array) of the shield.

The filling fraction is preferably above 15%. More preferably, the filling fraction is above 19%. More preferably, the filling fraction is above 50%. The appearance of partial stop bands can be seen for a radius of inclusion of 0.25 of a square unit cell, so an area fraction of $0.25*0.25*3.14=0.19$ (19%). Note that large (and complete i.e. for all polarizations and crystallographic direction) stop bands can be observed for radius greater than 0.4 so area fraction of 50%. The filling fraction may be below 10-20% so as to make the installation of a shield more practicable.

The columns alter the properties of the shield by fixing points of the shield to the bedrock via the columns, thereby altering the dispersion of seismic waves through the shield. This results in stop bands and in particular a stop band near 0 Hz, caused by the pinning effect that results from the contact between the columns and the bedrock. The effectiveness is affected by the filling fraction of the columns in the shield. As discussed above, the pinning effect is increased by clamping the columns in the bedrock.

In this embodiment, the columns are placed in the ground in a periodic square array. Other arrays could also be used such as triangular or hexagonal arrays. Preferably the width of the shield (in the direction of the propagation of the seismic waves to be stopped as discussed above) is at least twice the spacing between columns in order to allow 3 or more rows of columns in the shield.

The periodicity of the array is a secondary factor in producing the stop band and reflecting the seismic waves because the wavelength is large in comparison with the spacing of the columns, so columns do not necessarily have to be placed in a periodic pattern. Columns may be placed in a quasi-random pattern or a quasi-periodic (e.g. Penrose) pattern. Columns may alternatively be placed randomly in the area to be covered by the shield. The positions of columns may be chosen to avoid obstacles in the area (such as buildings or roads) or may be chosen where the bedrock is closer to the surface to reduce the height of the column required. The arrangement (spacing and/or lattice shape) of the columns may vary gradually over the shield from one end of the shield to the other.

The shape of the columns in this embodiment is cylindrical. Other embodiments may use different shapes (triangles, squares, pentagons, hexagons, circles, rectangles, ellipses, star-shaped) and cross sections for the columns. The columns within one shield may also be different shapes and the shape of the cross-sections of the columns may vary gradually over the shield from one end of the shield to the other. The cross-section of the columns need not be constant along the length (height) of the columns (e.g. the cross section can vary periodically along the length to create additional stop bands in the vertical direction to reflect volume seismic waves propagating obliquely from the bedrock upwards).

The columns extend from the bedrock towards the surface of the ground, but may have their upper surface below the ground (for example, 1 to 5 m below) with a soil or urban covering. The height of the columns depends on the depth of the surface bedrock in the area of the shield. In this example, the height of the columns is 10 metres. In other embodiments columns of around 50 metres may be used. Where necessary due to the depth of the bedrock beneath the ground, columns between 10 metres and 200 metres tall may be used. Where the bedrock is deeper than this, taller columns may be used to reach the depth of the bedrock. The depth of the soil above the bedrock may be around 15 m and the depth of the bedrock may be around 5 m.

The columns or a sub-set of the columns may be joined by plates. These plates may be made of concrete, steel, a combination of concrete and steel or another solid material. The plates improve the stability of the columns, and insert additional stop-bands. The plates may be located around 5 metres below the ground surface. They may extend between neighbouring columns. They may extend horizontally. They may also be in contact with or embedded in the bedrock. They may have a planar shape, the plane being substantially vertical. The increased stability of the columns increases the effects of clamping, thereby reducing the lower frequency limit of the stop band because the columns are more securely fixed due to their interconnection. The addition of the plates creates additional stop bands as the shield can be approximated to a lattice of beams connecting masses. This creates additional stop bands associated with the beam's vibrations.

The columns may all be attached to each other by a lattice of plates which join adjacent columns. For example, where columns are arranged in a square or rectangular grid, plates may attach each column to its four nearest neighbours (three for triangular grid etc.).

A column of the shield is produced by boring a hole of the shape and size of the column into the ground, through the regolith and down to the bedrock surface. If the column is to be embedded into the bedrock, the hole is extended the required distance into the bedrock by boring. The hole is then filled with the desired material, which may be concrete. Where the column contains concrete, the column may be formed within the shield, by pouring unset concrete into the hole, so that the concrete then sets to form the column.

The invention may be implemented in order to protect a whole city by arranging a shield around a boundary of the city. The invention may be implemented in order to protect a critical facility such as a nuclear power plant or oil refinery by arranging a shield around the boundary of the facility. The shield may be positioned less than 5 metres from the boundary of a building or structure to be protected. Individual buildings may be protected by the invention by arranging a shield around a boundary of a building. The shield may be spaced laterally from the building so that the building does not overlie the shield. The shield may be positioned between 2 and 10 metres from the perimeter of a building. The shield may be outside of the lateral perimeters of any buildings such that no buildings overlie the shield. The shield can also protect bridges, dams, airports, nuclear plants and even cities. The columns of the shield can be separate and unconnected to the building or structure to be protected. The shield can be positioned so that it is not directly connected to the structure or building.

Areas may also be protected from locally produced seismic waves, for example from trains or vibrating equipment by positioning a shield around the source, in order to prevent seismic waves from leaving the area in which they were produced. This may be particularly useful in building work that occurs in built up areas where multiple buildings are to be protected from seismic waves produced by equipment used in one location as it is more practical and cost effective.

Where a shield is primarily to protect an area from a localised source of seismic waves, the shield may be placed(s) on only the sides of the area that face the source. Where the source of the seismic waves is not known in advance (e.g. in an earthquake zone) the shield may be placed around the whole boundary of an area to be protected.

An embodiment of the invention is shown in FIG. 1, where a seismic wave shield is positioned around a building to be protected. There are two rows of cylindrical columns 1 and the columns are arranged on points of a square lattice. The columns are spaced from the building 2, so that the building does not overlie the columns. The curved arrows indicate seismic waves approaching the building which are stopped by the shield. The seismic waves are made up of surface Rayleigh waves R, bulk pressure waves P and shear waves S. In this embodiment, the regolith is soil 3. The columns are clamped to the bedrock as the bottom portions of the columns are embedded in the bedrock.

Figure 2:
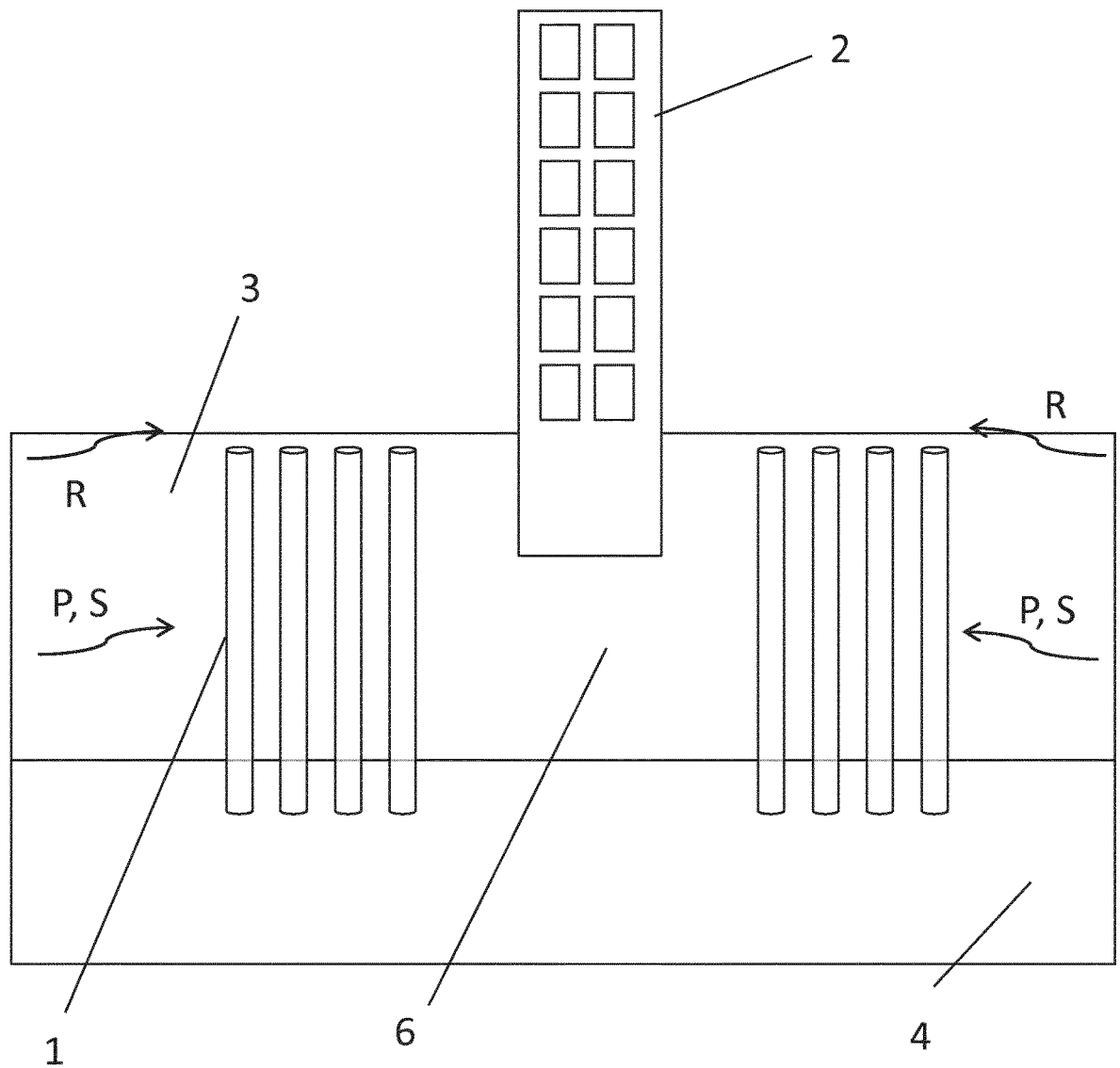
FIG. 2 shows a vertical section view of a shield, which is an embodiment of the present invention, surrounding a building.

FIG. 2 shows another embodiment of the invention, similar to the embodiment of FIG. 1, but having four rows of columns 1 making up the shield. This Figure shows that bulk pressure waves P, shear waves S and Rayleigh (surface) waves R travelling towards the building 2 through the soil 3 are all stopped by the shield. The bottom portions of the columns can be seen as embedded in the bedrock 4. The columns protect the region 6 from Rayleigh surface waves R, Bulk pressure waves P and shear waves S.

Figure 3:
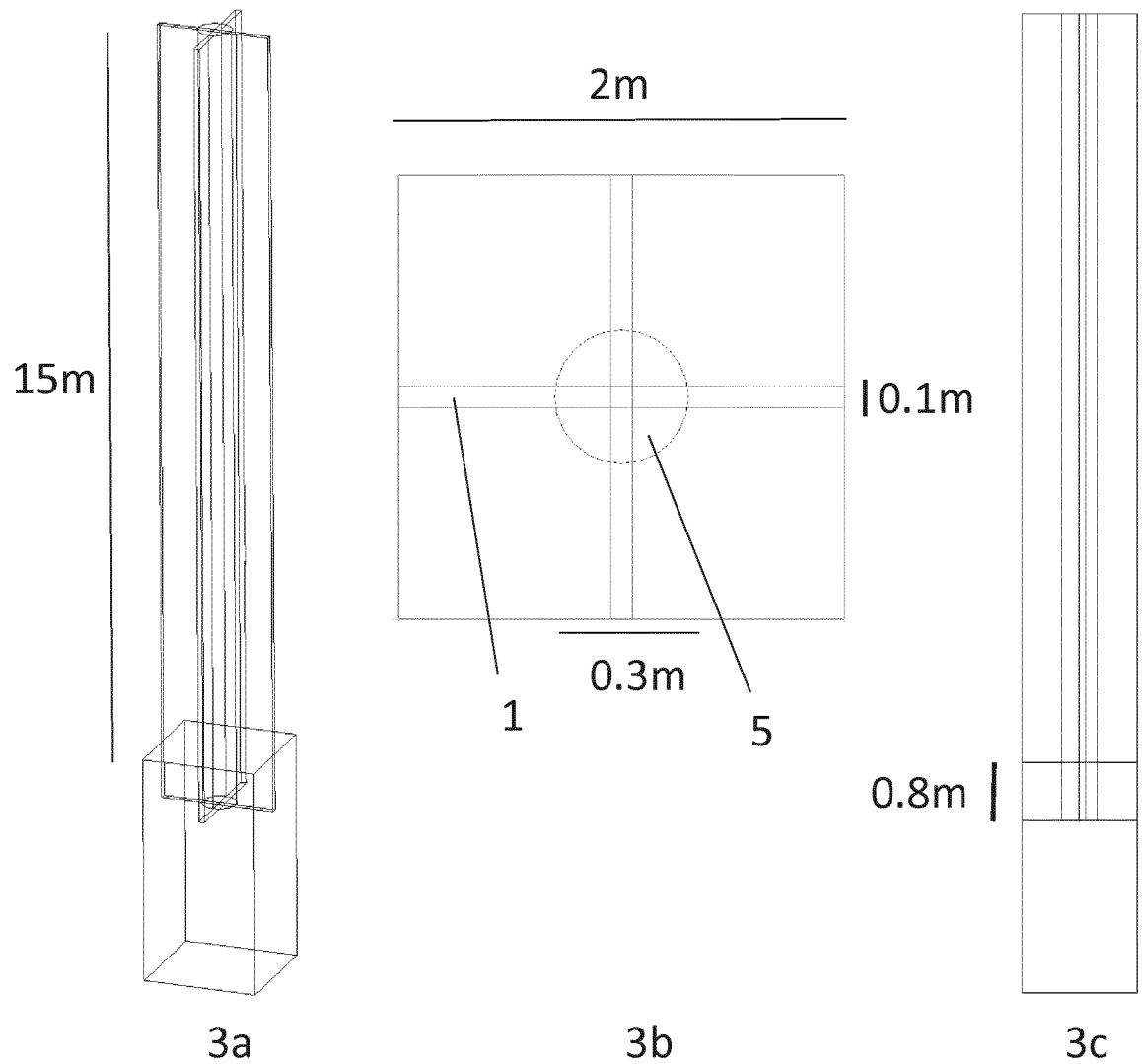
FIG. 3a shows a perspective view of column of a shield according to the present invention with plates attached.
FIG. 3b shows a top view of column of a shield according to the present invention with plates attached.
FIG. 3c shows a side view of column of a shield according to the present invention with plates attached.

A column 1 having plates 5 attached is shown in FIG. 3. The Figure shows a unit cell of a shield where the regolith has been made transparent in order to allow the column and plates to be seen. The unit cell contains one column. The column is cylindrical and has a diameter of 30 cm. The height of the column above the bedrock is 15 m and the height of the bottom portion of the column which is embedded in the bedrock is 80 cm, thus the total height of the column is 15.8 m. The column is attached to four plates which extend between adjacent columns. The plates 5 are 10 cm thick and 1.7 m wide (only half of each plate is shown in the unit cell). The plates are the same height (15.8 m) as the columns. A shield is formed by placing many of the unit cells of FIG. 3 next to each other in a square array. The plates extend between the surfaces of two adjacent columns.

Figure 4:
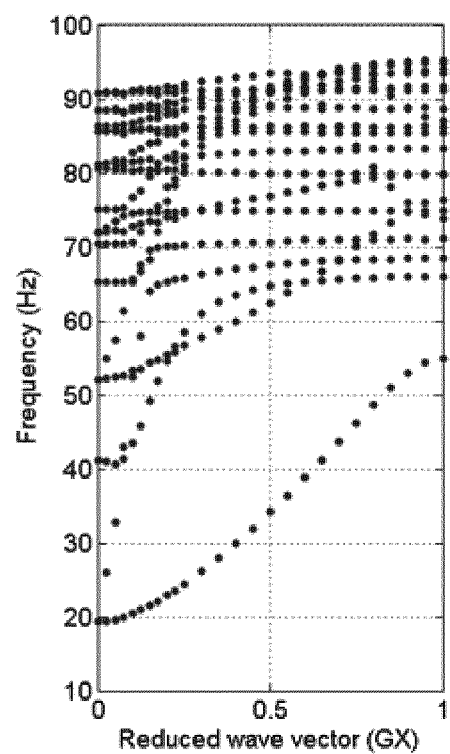
FIG. 4 shows the band diagram of a shield formed of columns shown in FIG. 3.

The band diagram for a shield made up of the columns shown in FIG. 3 is shown in FIG. 4. This shows a stop band for frequencies below 20 Hz. This means that a shield made up of a square array of the unit cells of FIG. 3 will stop seismic waves with frequencies below 20 Hz.

Typical values of parameters of concrete which is an example of a material forming the columns are shown in Table 1. Typical values of parameters of several types of sedimentary soil which are examples of materials forming regolith are shown in Table 2.

TABLE 1

Typical parameters for concrete (source Stéphane Brûlé)

| | Symbol | Unit | Value Min | Value Max |
|---|---|---|---|---|
| Density C12 | $\rho$ | kg/m³ | 2 200 | 2 200 |
| Compressional wavespeed | $V_p$ | m/s | 4 100 | 3 500 |
| Poisson ration ($\nu$ = 0.2: good, $\nu$ = 0.3 bad quality) | $\nu$ | NA | 0.2 | 0.2 |
| Ratio of compressional wavespeed over shear wavespeed | $V_p/V_s$ | NA | 1.63 | 1.63 |
| Shear wavespeed for small deformations | $V_s$ | m/s | 2 511 | 2 143 |
| Young modulus for small deformations (<10⁻⁵) | E | MPa | 33 284 | 24 255 |
| Shear modulus for small deformations (<10⁻⁵) | G | MPa | 13 868 | 10 106 |

TABLE 2

Typical parameters for sedimentary soil (source Stéphane Brûlé)

| Description lithologique de l'Eurocode 8 | Symbol | Unit | Soil of class C Sedimentary soil with sand of average density, clay of average stiffness, with thickness of a few tenths to few hundreds of meters | | | |
|---|---|---|---|---|---|---|
| Density | $\rho$ | kg/m³ | 1600 | 1600 | 1900 | 1900 |
| Shear wavespeed according to Eurocode 8 | $V_s$ | m/s | 180 | 360 | 180 | 360 |
| Poisson ratio | $\nu$ | sans | 0.3 | 0.3 | 0.3 | 0.3 |
| Young modulus for small deformations (<10⁻⁵) | E | MPa | 135 | 539 | 160 | 640 |
| Shear modulus for small deformations (<10⁻⁵) | G | MPa | 52 | 207 | 62 | 246 |
| Ratio of Young modulus (i.e. contrast) between concrete and soil $E_{concrete\ min}/E_{soil}$ | $E_{concrete}/E_{soil}$ | NA | 180 | 45 | 152 | 38 |

In one example of a seismic shield, a large number of cylindrical columns of steel (density of 7850 kg/m3) each having a diameter of 1.2 m are used with a soil regolith which is 15 m deep above a bedrock which is 5 m deep. A bottom portion of each column is embedded in the bedrock, the bottom portion having a height of 80 cm. The columns are arranged in a square array so that the distance between the centre of nearest neighbouring columns is 2 m. The columns are 15.8 m tall so that they reach the surface of the regolith. A zero-frequency band gap up to around 4.5 Hz is caused by such a shield.

A large number of columns may be thirty columns arranged in three rows of ten columns.

In another example of a seismic shield, a large number of cylindrical columns of steel (density of 7850 kg/m3) each having a diameter 0.2 m are used in a soil regolith which is 15 m deep above a bedrock which is 5 m deep. The columns are arranged in a square array so that the distance between the centre of nearest neighbouring columns is 2 m. Further, the columns are each joined to each of their nearest neighbours by steel plates 0.2 m in thickness. Thus the columns and the plates together have a cross-shaped cross-section. The bottom 80 cm of the columns and the plates are embedded in the bedrock. The columns are 15.8 m tall so that they reach the surface of the regolith. This shield may be modified by removing the bottom portion of the columns so that the columns are not embedded in the bedrock and are 15 m tall. This shield may be modified by removing the bottom portion of the columns so that the columns are not embedded in the bedrock and are 15 m tall. A zero-frequency band gap up to around 26 Hz is caused by such a shield. The shield of this example may be modified by making the columns of a diameter of 0.3 m.

In another example of a seismic shield, a large number of cylindrical columns of steel (density of 7850 kg/m3) each having a diameter 0.3 m are used in a soil regolith which is 15 m deep above a bedrock which is 5 m deep. The columns are arranged in a honeycomb array so that the distance between the centre of nearest neighbouring columns is 2 m. Further, the columns are each joined to each of their nearest neighbours by steel plates 0.3 m in thickness. The bottom 80 cm of the columns and the plates are embedded in the bedrock. The columns are 15.8 m tall so that they reach the surface of the regolith. A zero-frequency band gap up to around 20 Hz is caused by such a shield.

A similar array using a hexagonal lattice can produce a zero-frequency band gap up to around 18 Hz.

In another example of a seismic shield, a large number of cylindrical columns of steel (density of 7850 kg/m3) each having a diameter 0.3 m are used in a soil regolith which is 15 m deep above a bedrock which is 5 m deep. The columns are arranged in a square array so that the distance between the centre of nearest neighbouring columns is 2 m. The columns pierce a horizontal steel plate of 0.2 m thickness located at a height of 7.5 m from the bedrock. This shield may be modified to have three or seven equally spaced horizontal plates. The columns are 15.8 m tall so that they reach the surface of the regolith.

In a further example of a seismic shield, a large number of cylindrical columns of steel (density of 7850 kg/m3) each having a radius of 0.6 m are used in a soil regolith which is 15 m deep above a bedrock which is 5 m deep. A bottom portion of each column is embedded in the bedrock, the bottom portion having a height of 80 cm. The columns are arranged in a square array so that the distance between the centre of nearest neighbouring columns is 2 m. The columns are 15.8 m tall so that they reach the surface of the regolith. This shield may be modified by removing the bottom portion of the columns so that the columns are not embedded in the bedrock and are 15 m tall.

The invention claimed is:

1. A seismic wave shield comprising a set of at least two rows of columns, the at least two rows of columns being spaced apart from each other and embedded in regolith, wherein the Young's modulus of the material forming the columns is at least 10 times higher than the Young's modulus of the regolith and wherein the columns are positioned on points of a hexagonal, or other Bravais, lattice and are in contact with and clamped to bedrock to form a stop band for blocking seismic waves, with a zero or near zero lower frequency limit, wherein there is a material contrast between a material forming the columns and the regolith, and further wherein the seismic wave shield is positioned outside of and away from a lateral perimeter of a building, wherein a width of the shield in a direction of waves to be blocked is defined by the at least two rows of columns, and wherein a total volume of the columns is at least 15% of the volume of the seismic wave shield.

2. A seismic wave shield according to claim 1 wherein the material forming the columns has a higher density than the regolith.

3. A seismic wave shield according to claim 1 wherein a bottom portion of each of the columns is embedded in the bedrock.

4. A seismic wave shield according to claim 3 wherein columns are embedded in the bedrock by more than 0.3 m.

5. A seismic wave shield according to claim 1 wherein the material forming the columns is at least 1.1 times as dense as the regolith.

6. A seismic wave shield according to claim 1 wherein the columns are positioned periodically or near periodically in the seismic wave shield.

7. A seismic wave shield according to claim 1 wherein a width of the shield in a direction of waves to be blocked is greater than two rows of columns.

8. A seismic wave shield according to claim 1 further comprising a plate attached at a first end of the plate to a first column of the seismic wave shield, the plate further being attached at a second end of the plate to a second column of the seismic wave shield.

9. A seismic wave shield according to claim 1 wherein at least one of the columns comprise concrete.

10. A seismic wave shield according to claim 1 wherein at least one of the columns comprises steel and concrete.

11. A seismic wave shield according to claim 10, wherein the at least one of the columns is made up of layers of concrete and layers of steel which alternate vertically up the column.

12. A seismic wave shield according to claim 10, wherein the at least one of the columns is made up of concentric circle sections of concrete and steel.

13. A seismic wave shield according to claim 10, wherein the at least one of the columns is formed of a sleeve of steel surrounding a column of concrete.

14. A seismic wave shield according to claim 1, wherein the total volume of the columns as a fraction of the volume of the seismic wave shield varies across the seismic wave shield.

15. A seismic wave shield according to claim 14, wherein a part of the seismic wave shield most exposed to the waves has a higher total volume of the columns as a fraction of the volume of the seismic wave shield and a part of the seismic wave shield least exposed to the waves has a lower total volume of the columns as a fraction of the volume of the seismic wave shield.

16. A seismic wave shield according to claim 1, wherein the distance between the centers of neighboring columns is at least twice the diameter of the columns.

17. A seismic wave shield according to claim 1, wherein the distance between the centers of neighboring columns is 10 to 100 times smaller than a wavelength of seismic waves which are blocked by the seismic wave shield.

18. A method of shielding an area from seismic waves by installing a seismic wave shield according to claim 1 on at least a part of a perimeter of the area.

19. A seismically shielded building comprising a seismic wave shield according to claim 1 positioned adjacent to a part of a perimeter of a building and outside of said perimeter.

* * * * *